United States Patent [19]

Yamamoto et al.

[11] Patent Number: 5,245,007
[45] Date of Patent: Sep. 14, 1993

[54] METHOD FOR PURIFYING ETHYLENE-α-OLEFIN COPOLYMER

[75] Inventors: Keisaku Yamamoto; Kizuku Wakatsuki; Kiyoyuki Sugimori; Hayato Saba; Katsunari Inagaki, all of Chiba, Japan

[73] Assignee: Sumitomo Chemical Co., Ltd., Osaka, Japan

[21] Appl. No.: 805,651

[22] Filed: Dec. 12, 1991

[30] Foreign Application Priority Data

Dec. 14, 1990 [JP] Japan .................. 2-402206
Dec. 18, 1990 [JP] Japan .................. 2-403162

[51] Int. Cl.$^5$ ............................... C08F 6/08
[52] U.S. Cl. ..................... 528/483; 528/489; 528/497; 528/499
[58] Field of Search ............. 528/488, 483, 497, 499, 528/489

[56] References Cited

U.S. PATENT DOCUMENTS

| | | | |
|---|---|---|---|
| 3,119,797 | 1/1964 | McGaughy | 528/488 |
| 3,374,212 | 3/1968 | Marinak et al. | 528/488 |
| 3,496,156 | 2/1970 | Luciani et al. | 528/488 |
| 3,644,321 | 2/1972 | Koga et al. | 528/488 |

FOREIGN PATENT DOCUMENTS

| | | |
|---|---|---|
| 655084 | 4/1965 | Belgium . |
| 676500 | 6/1966 | Belgium . |
| 683637 | 1/1967 | Belgium . |
| 1180178 | 6/1959 | France . |
| 1551506 | 12/1968 | France . |

*Primary Examiner*—Joseph L. Schofer
*Assistant Examiner*—Tom Weber
*Attorney, Agent, or Firm*—Sughrue, Mion, Zinn, Macpeak & Seas

[57] ABSTRACT

A method for purifying an ethylene-α-olefin olefin having at least 3 carbon atoms, or ethylene with an α-olefin having at least 3 carbon atoms and a nonconjugated diene compound, in a hydrocarbon solvent in the presence of a catalyst comprising a vanadium compound, an organoaluminum compound, and a halogenated ester compound, the method including a step of mixing and stirring the polymerization reaction mixture obtained by the polymerization reaction in an aqueous alkaline solution in such an amount as to give an aqueous phase having a pH of not lower than 10.0 after mixing and stirring, is disclosed. A method for purifying an ethylene-α-olefin copolymer is also disclosed, including a step of an oxidation treatment of the polymerization reaction mixture in an aqueous alkaline solution in such an amount as to give an aqueous phase having a pH of not lower than 10.0 after the oxidation treatment.

14 Claims, No Drawings

METHOD FOR PURIFYING ETHYLENE-α-OLEFIN COPOLYMER

FIELD OF THE INVENTION

This invention relates to a method for purifying an ethylene-α-olefin copolymer. More particularly, it relates to a method for purifying an ethylene-α-olefin copolymer which comprises removing catalytic ingredients, etc. from an ethylene-α-olefin copolymer obtained by copolymerizing ethylene with an α-olefin having at least 3 carbon atoms, or ethylene with an α-olefin having at least 3 carbon atoms and a non-conjugated diene compound, in a hydrocarbon solvent in the presence of a catalyst comprising a vanadium compound and an organoaluminum compound, or a catalyst comprising a vanadium compound, an organoaluminum compound, and a halogenated ester compound.

BACKGROUND OF THE INVENTION

In the preparation of an ethylene-α-olefin copolymer in a hydrocarbon solvent in the presence of a catalyst comprising a vanadium compound and an organoaluminum compound, or a catalyst comprising a vanadium compound, an organoaluminum compound, and a halogenated ester compound, if the catalytic ingredients, etc. remain or are incorporated in the copolymer as a final product, problems such as discoloration of the copolymer and deterioration in weather resistance and heat resistance of the copolymer occur. Hence, the catalytic ingredients, etc. remained in the copolymer obtained by the polymerization reaction must be completely removed from the copolymer.

Conventional methods for removing the catalytic ingredients from the ethylene-α-olefin copolymer prepared in the presence of a vanadium-based catalyst include a method wherein a large amount of water is added to a polymer solution, the mixture is mixed in a mixer, the catalyst is extracted into an aqueous phase, the aqueous phase is separated from an organic phase, and the polymer containing a reduced amount of the catalytic ingredients is recovered from the organic phase; and a method wherein water or an alcohol is added to a slurry obtained by a copolymerization reaction in a solvent which does not dissolve therein the polymer, to reduce the amount of catalytic residue in the polymer [see, Yasuharu Saeki, *Polymer Production Process*, published by Kogyo Chosakai (1971)].

However, these methods have some disadvantages described below.

In the method wherein a polymer solution is treated with a large amount of water, it is considered that the catalytic ingredients which are solubilized in water by bringing them into contact with water are extracted with water. However, when one expects that the catalytic ingredients are more completely removed, the mixing of the polymer solution with water must be thoroughly made, and a large-size, heavy-duty mixer must be used at a high speed (at high revolution number). Hence, much costs of equipment and power are required and, therefore, the method is not industrially advantageous.

In the method using an alcohol, etc., the alcohol must be purified and reused and, hence, not only the process is complicated, but an energy consumption is increased. Thus, the method is not industrially advantageous, too.

As other methods, JP-A-63-275605 (the term "JP-A" as used herein means an "unexamined published Japanese patent application") discloses a method wherein copolymers prepared in the presence of a titanium-based catalyst are washed with water containing an alkaline compound; and JP-B-43-6471 (the term "JP-B" as used herein means an "examined Japanese patent publication") discloses a method wherein copolymers prepared in the presence of a vanadium-based catalyst are oxidized and then washed with water containing an alkaline compound.

In recent years, since ethylene-α-olefin rubbery copolymers are mixed with other resins such as polypropylene and widely used in the fields of automobile parts and packaging materials, the requirements on weather resistance, non-discoloration, etc. of the rubbery copolymers have become severer. In order to meet the requirements, it is highly demanded to further reduce the amount of the catalytic ingredients remained in the rubbery copolymer. For example, it is demanded that the amount of the vanadium compound remained in the copolymer is reduced to not higher than 1 ppm in terms of $V_2O_5$.

Further, there is a problem that in addition to the metallic catalytic ingredients, halogenated ester compounds used as activating agents for the polymerization reaction are remained in the copolymer. When the halogenated ester compounds are remained in the copolymer, such a problem as lowering in the quality of the copolymer caused by halogens occurs, that is, corrosion of processing machines and coloration of the copolymers occur so that the copolymers are no longer applicable to vessels and packaging materials for foods and medicines.

Under these circumstances, the conventional techniques described in the aforesaid patent specifications are not yet satisfactory.

Thus, in order to solve such problems as mentioned above, the present inventors have made extensive researches and eventually accomplished the present invention.

SUMMARY OF THE INVENTION

An object of the present invention is to provide a method capable of removing catalytic ingredients, etc. to a level which could not be achieved by conventional methods in purifying an ethylene-α-olefin copolymer obtained by polymerizing ethylene with an α-olefin having at least 3 carbon atoms, or ethylene with an α-olefin having at least 3 carbon atoms and a nonconjugated diene compound, in a hydrocarbon solvent in the presence of a catalyst comprising a vanadium compound and an organoaluminum compound, or a catalyst comprising a vanadium compound, an organoaluminum compound, and a halogenated ester compound.

Accordingly, in one embodiment (first invention), the present invention relates to a method for purifying an ethylene-α-olefin copolymer obtained by polymerizing ethylene with an α-olefin having at least 3 carbon atoms, or ethylene with an α-olefin having at least 3 carbon atoms and a non-conjugated diene compound, in a hydrocarbon solvent in the presence of a catalyst comprising a vanadium compound, an organoaluminum compound, and a halogenated ester compound, the method including a step of mixing and stirring a polymerization reaction mixture obtained by the polymerization reaction in an aqueous alkaline solution in such an amount as to give an aqueous phase having a pH of not glower than 10.0 after mixing and stirring.

In another embodiment (second invention), the present invention relates to a method for purifying an ethylene-α-olefin copolymer obtained by polymerizing ethylene with an α-olefin having at least 3 carbon atoms, or ethylene with an α-olefin having at least 3 carbon atoms and a non-conjugated diene compound, in a hydrocarbon solvent in the presence of a catalyst comprising a vanadium compound and an organoaluminum compound, the method including a step of treating a polymerization reaction mixture obtained by the polymerization reaction with an oxidizing agent in an aqueous alkaline solution in such an amount as to give an aqueous phase having a pH of not lower than 10.0 after oxidation.

DETAILED DESCRIPTION OF THE INVENTION

Materials to be purified in the present invention are polymerization reaction mixtures containing an ethylene-α-olefin copolymer obtained by polymerizing ethylene with an α-olefin having at least 3 carbon atoms, or ethylene with an α-olefin having at least 3 carbon atoms and a non-conjugated diene compound, in a hydrocarbon solvent in the presence of a catalyst comprising a vanadium compound and an organoaluminum compound, or a catalyst comprising a vanadium compound, an organoaluminum compound, and a halogenated ester compound.

Any of solvents in which the copolymer is soluble or insoluble can be used as the hydrocarbon solvent. Examples of the solvents which can be suitably used include aromatic compounds such as benzene and toluene; aliphatic hydrocarbon compounds such as pentane, hexane, and heptane; alicyclic hydrocarbon compounds such as cyclopentane, methylcyclopentane, and cyclohexane; α-olefins such as liquefied propylene, liquefied 1-butene, and 4-methylpentene-1; and mixtures thereof.

Examples of the vanadium compound which can be used in the present invention include $VCl_3$, $VCl_4$, $VOCl_3$, and $VO(OR)_{3-m}Cl_m$ (wherein R is a straight chain or branched alkyl group, a cycloalkyl group, or an aryl group, each having 1 to 10 carbon atoms; and $3 \geq m \geq 0$), such as $VO(OCH_3)_2Cl_2$, $VO(OCH_3)_2Cl$, $VO(OCH_3)_3$, $VO(OC_2H_5)_2Cl_2$, $VO(OC_2H_5)_2Cl$, $VO(OC_2H_5)_3$, $VO(OC_3H_7)Cl_2$, $VO(OC_3H_7)_2Cl$, $VO(OC_3H_7)_3$, $VO(OisoC_3H_7)Cl_2$, $VO(OisoC_3H_7)_2Cl$, $VO(OisoC_3H_7)_3$, $V(OCH_3)_3$, and $V(OCH_2COOCH_3)_3$.

Examples of the organoaluminum compound which can be used include $AlR'_nCl_{3-n}$ and $AlR'_n(OR')_3$ (wherein R' is a straight chain or branched alkyl group having 1 to 8 carbon atoms; and $3 \geq n \geq 0$), such as $(C_2H_5)_2AlCl$, $(C_4H_9)_2AlCl$, $(C_6H_{13})_2AlCl$, $(C_2H_5)_{1.5}AlCl_{1.5}$, $(C_4H_9)_{1.5}AlCl_{1.5}$, $(C_6H_{13})_{1.5}AlCl_{1.5}$, $C_2H_5AlCl_2$, $C_4H_9AlCl_2$, and $C_6H_{13}AlCl_2$.

The halogenated ester compound which can be effectively used is a compound represented by the following formula:

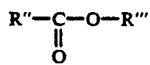

wherein R" represents an organic group having 1 to 20 carbon atoms, which is partially or wholly substituted by a halogen atom; and R''' represents a hydrocarbon group having 1 to 20 carbon atoms. Compounds wherein R''' is wholly substituted by chlorine atoms and compounds having a phenyl group and a chlorine-substituted alkyl group are preferred. More preferred are perchlorocrotonic acid esters, perchloro-3-butenoic acid esters, and phenyldichloroacetic acid esters.

Specific examples of the halogenated ester compound include ethyl dichloroacetate, methyl trichloroacetate, ethyl trichloroacetate, methyl dichlorophenylacetate, ethyl dichlorophenylacetate, methyl perchlorocrotonate, ethyl perchlorocrotonate, propyl perchlorocrotonate, isopropyl perchlorocrotonate, butyl perchlorocrotonate, cyclopropyl perchlorocrotonate, phenyl perchlorocrotonate, methyl perchloro-3-butenoate, ethyl perchloro-3-butenoate, propyl perchloro-3-butenoate, and butyl perchloro-3-butenoate.

In addition to these catalytic ingredients, hydrogen, etc. as a molecular weight modifier may be used in the present invention.

Examples of α-olefin having at least 3 carbon atoms include propylene, 1-butene, 1-pentene, 1-hexene, 4-methylpentene-1, 1-octene, and 1-decene.

Examples of the non-conjugated diene compound include dicyclopentadiene, tricyclopentadiene, 5-methyl-2,5-norbornadiene, 5-methylene-2-norbornene, 5-ethylidene-2-norbornene, 5-isopropylidene-2-norbornene, 5-isopropenyl-2-norbornene, 5-(1'-butenyl)-2-norbornene, 5-(2'-butenyl)- 2-norbornene, 1,4-hexadiene, 1,6-octadiene, and 6-methyl-1,5-heptadiene.

There is no particular limitation with regard to other polymerization conditions than those described above.

The polymerization reaction mixtures to be purified in the present invention can be obtained in the manner mentioned above.

The purification method of the present invention is illustrated below.

First, the first invention of the present invention is illustrated below. The first invention of the present invention relates to a method for purifying an ethylene-α-olefin copolymer, the method including a step of mixing and stirring the above-described polymerization reaction mixture in an aqueous alkaline solution in such an amount as to give an aqueous phase having a pH of not lower than 10.0 after mixing and stirring.

A more specific and preferred method thereof is a method comprising the following first and second stages.

First stage: A stage wherein the polymerization reaction mixture is mixed and stirred in an aqueous solution containing an alkaline compound in such an amount that an aqueous phase separated in the subsequent second stage has a pH of not lower than 10.0.

Second stage: A stage wherein the mixture obtained in the first stage is separated into an aqueous phase and an organic phase, and the organic phase is washed with neutral water.

Another preferred method is a method comprising the following first to three stages.

First stage: A stage wherein the polymerization reaction mixture obtained by the polymerization reaction is mixed and stirred in an aqueous solution containing an alkaline compound in such an amount that an aqueous phase formed in the subsequent second stage has a pH of not lower than 10.0.

Second stage: A stage wherein one part by volume of the mixture obtained in the first stage is mixed with 1/5 to 10 parts by volume of neutral water.

Third stage: A stage wherein the mixture obtained in the second stage is separated into an aqueous phase and an organic phase, and the organic phase is washed with neutral water.

Examples of the alkaline compound which can be used in the present invention include lithium hydroxide, sodium hydroxide, potassium hydroxide, concentrated ammonia, and ammonium hydroxide. Among them, lithium hydroxide, potassium hydroxide, and sodium hydroxide are particularly preferred. The alkaline compound must be used in an amount sufficient to give an aqueous phase having a pH of not lower than 10.0, and preferably not lower than 11.0, the aqueous phase being separated from the organic phase after mixing and stirring. When the amount of the alkaline compound is insufficient, the removal of the catalytic ingredients, etc. is insufficiently made.

A preferred embodiment for adding the aqueous alkaline solution is concerned with a method wherein an aqueous alkaline solution having a pH of not lower than 12, and preferably not lower than 13, is used, 1/1000 to 10 parts by volume of the aqueous alkaline solution is added to and mixed with one part by volume of the polymerization reaction mixture with stirring, and 1/5 to 10 parts by volume of water is additionally added thereto and mixed therewith to separate the mixture into an oily phase and an aqueous phase.

As mentioned above, water must be added in an amount sufficient to extract therewith ashes mainly formed from the catalytic ingredients and to separate the mixture into an organic phase and an aqueous phase. Specifically, the amount of water added is 1/5 to 10 parts by volume, and preferably ¼ to 5 parts by volume, per part by volume of the polymerization reaction mixture.

It is preferred that water to be added has an iron content as low as possible. When iron components exist in water, the desired copolymer is apt to be colored. Preferably, the concentration of the iron components is not higher than 0.1 ppm.

The mixing and stirring of the polymerization reaction mixture with the aqueous alkaline solution may be carried out by using any method, so long as the catalytic ingredients, etc. can be efficiently brought into contact with the aqueous alkaline solution to extract the catalytic ingredients, etc. into the aqueous phase. Specifically, a method using a line mixer, etc. can be used. As a method for separating the aqueous phase and the organic phase, for example, a method using a stationary separating drum can be used, though there is no particular limitation. The stage of mixing and stirring the polymerization reaction mixture with the aqueous alkaline solution and the stage of separating the aqueous phase and the organic phase are carried out at a temperature of generally 20° to 160° C, and preferably 50° to 100° C. under a pressure of 0 to 20 kg/cm$^2$G, and preferably 2 to 10 kg/cm$^2$G. In the practice of the present invention, it is preferred that after the stage of treating the polymerization reaction mixture with the aqueous alkaline solution and the stage of separating the aqueous phase and the organic phase are carried out, water washing is carried out several times.

The thus obtained organic phase containing the desired copolymer is subjected to a conventional aftertreatment stage. For example, the hydrocarbon solvent is distilled off by evaporation upon heating, and the residue is dried to obtain the desired ethylene-α-olefin copolymer.

The function of the first invention is illustrated below.

While the characteristic features of the present invention have been described above, the important characteristic feature of the present invention resides in mixing and stirring the polymerization reaction mixture with the aqueous alkaline solution. When the halogenated ester compound is treated with an aqueous alkaline solution having a relatively high pH value, the compound is easily decomposed and extracted into the aqueous phase.

On the contrary, the decomposition reaction of the halogenated ester compound proceeds very slowly at a pH of not higher than 10.0 or under neutral or acidic conditions, and it is substantially impossible to completely decompose and remove the halogenated ester compound.

Further, the treatment with the aqueous alkaline solution does not interfere with the decomposition and extraction of the residue of the vanadium compound and organoaluminum compound-based catalyst but rather has an effect of accelerating the decomposition and extraction thereof. Accordingly, the purification method of the present invention is very effective as a method for decomposing and removing both the metallic catalyst residue and the halogenated ester compound.

Then, the second invention of the present invention is illustrated below. The second invention of the present invention relates to a method for purifying an ethylene-α-olefin copolymer, the method including a step of an oxidation treatment of the above-described polymerization reaction mixture in an aqueous alkaline solution in such an amount as to give an aqueous phase having a pH of not lower than 10.0 after the oxidation treatment.

A preferred method thereof is a method comprising the following first and second stages.

First stage: A stage wherein the polymerization reaction mixture is oxidized with an aqueous solution containing an oxidizing agent in at least a stoichiometric amount required for oxidizing vanadium present in the polymerization reaction mixture to a pentavalent state and an alkaline compound in such an amount that an aqueous phase separated in the subsequent second stage has a pH of not lower than 10.0.

Second stage: A stage wherein the mixture obtained in the first stage is separated into an aqueous phase and an organic phase, and the organic phase is washed with neutral water.

Another preferred method of the second invention is a method comprising the following first to three stages.

First stage: A stage wherein the polymerization reaction mixture obtained by the polymerization reaction is mixed and stirred in an aqueous solution containing an alkaline compound in such an amount that an aqueous phase formed in the subsequent second stage has a pH of not lower than 10.0.

Second stage: A stage wherein 1/5 to 10 parts by volume of water containing an oxidizing agent in at least a stoichiometric amount required for oxidizing vanadium in the polymerization reaction mixture to a pentavalent state is added to one part by volume of the mixture obtained in the first stage.

Third stage: A stage wherein the mixture obtained in the second stage is separated into an aqueous phase and an organic phase, and the organic phase is washed with neutral water.

Examples of the alkaline compound which can be used in the present invention include lithium hydroxide, sodium hydroxide, potassium hydroxide, concentrated ammonia, and ammonium hydroxide. Among them, lithium hydroxide, potassium hydroxide, and sodium hydroxide are particularly preferred. The alkaline compound must be used in an amount sufficient to give an aqueous phase having a pH of not lower than 10, and preferably not lower than 11, the aqueous phase being separated from the organic phase after the oxidation treatment. When the amount of the alkaline compound is insufficient, the removal of the catalytic ingredients, etc. is insufficiently made.

A preferred embodiment for adding the alkaline compound is concerned with a method wherein an aqueous alkaline solution having a pH of not lower than 12, and preferably not lower than 13, is used, and 1/1000 to 10 parts by volume of the aqueous alkaline solution is added to and mixed with one part by volume of the polymerization reaction mixture.

Examples of the oxidizing agent which can be used in the present invention include alkali metal nitrites, persulfates, peroxides, hypochlorites, oxygen, ozone, and air, such as sodium nitrite, potassium nitrite, hydrogen peroxide, and hydroxylamine hydrochloride. Among them, air or oxygen is particularly preferred as the oxidizing agent because not only air or oxygen is easy to handle, but there is no fear at all that air or oxygen remains in the copolymer. The oxidizing agent is used in at least a stoichiometric amount required for oxidizing all of vanadium present in the polymerization reaction mixture to a pentavalent state. When the amount of the oxidizing agent is insufficient, the removal of the catalytic ingredients, etc. can be insufficiently made, and the effect of the present invention can not be exhibited. When the oxidizing agent is used in an amount of twice or more the stoichiometric amount, the valence of all vanadium can be brought into a pentavalent oxidation state. Pentavalent vanadium is colorless and transparent and, hence, the final product copolymer can be completely prevented from being colored. However, when the oxidizing agents other than oxygen are excessively used, the oxidizing agents remain in the final product copolymer. Hence, it is desirable that the oxidizing agents other than oxygen are used in an amount of 10 times or less the stoichiometric amount. There is no fear that oxygen remains in the copolymer, even when oxygen is excessively used. However, when a large excess amount of oxygen is used in the continuous polymerization process (including a solvent recycling process), oxygen is accumulated in the solvents, and the copolymer is oxidized and deteriorated. Hence, it is desirable that oxygen is used in an amount of 50 times or less the stoichiometric amount. However, when an oxidizing agent-removing process is provided in an after-stage, such consideration is not required.

In the oxidation treatment, water is used in an amount sufficient to effectively extract therewith ashes mainly formed from the catalytic ingredients and to separate the organic phase and the aqueous phase. Specifically, water is used in an amount of preferably 1/5 to 10 parts by volume, and more preferably ¼ to 5 parts by volume per part by volume of the polymerization reaction mixture.

It is preferred that water to be used has an iron content as low as possible. When iron components exist in water, the desired copolymer is apt to be colored. Preferably, the concentration of the iron components is not more than 0.1 ppm.

The treatment of the polymerization reaction mixture with an aqueous alkaline solution and an aqueous alkaline solution containing an oxidizing agent may be carried out by using any method, so long as the catalytic ingredients, etc. can be efficiently brought into contact with these solutions to extract the catalytic ingredients, etc. into the aqueous phase. Specifically, a method using a line mixer, etc. can be used. As a method for separating the aqueous phase and the organic phase, for example, a method using a stationary separating drum can be used, though there is no particular limitation. The stage of treating the polymerization reaction mixture with the aqueous alkaline solution and the aqueous alkaline solution containing an oxidizing agent and the stage of separating the aqueous phase and the organic phase are carried out at a temperature of generally 20° to 160° C., and preferably 50° to 100° C. under a pressure of 0 to 20 kg/cm²G, and preferably 2 to 10 kg/cm²G. In the practice of the present invention, it is preferred that after the stage of treating the polymerization reaction mixture with the aqueous alkaline solution and the aqueous alkaline solution containing an oxidizing agent and the stage of separating the aqueous phase and the organic phase are carried out, water washing is carried out several times.

The thus obtained organic phase containing the desired copolymer is subjected to a conventional after-treatment stage. For example, the hydrocarbon solvent is distilled off by evaporation upon heating, and the residue is dried to obtain the desired ethylene-α-olefin copolymer.

The function of the second invention is illustrated below.

While the characteristic features of the present invention have been described above, the important characteristic feature of the present invention regarding the second invention resides in the oxidation treatment in an aqueous alkaline solution. The present inventors have made extensive studies to examine if effect of the present invention can be obtained by such a characteristic construction and reached the following conclusion.

When the polymerization reaction mixture is treated with an aqueous alkaline solution, a waterinsoluble low-valent vanadium compound remains in the organic phase. When the vanadium compound is oxidized with an oxidizing agent to a pentavalent state, since a hydroxide of pentavalent vanadium is well soluble in water, the hydroxide of pentavalent vanadium migrates into the aqueous phase and is removed from the organic phase. On the contrary, when the polymerization reaction mixture is subjected to the oxidation treatment under neutral or acidic conditions, an oxide of vanadium is formed. This compound is poor in solubility in water even under alkaline conditions and difficultly migrates into the aqueous phase and, hence, it is difficult to remove the compound. As a result, the vanadium compound remains in the desired copolymer. The organoaluminum compound and the halogenated ester compound as a polymerization activator can be decomposed and extracted into the aqueous phase when treated with an aqueous alkaline solution. The oxidation treatment does not interfere with the extraction of the vanadium compound but rather has an effect of accelerating the extraction of the vanadium compound into the aqueous phase.

The present invention is now illustrated in greater detail by reference to the following examples which, however, are not to be construed as limiting the invention in any way.

First, the first invention is illustrated by means of the following examples and comparative examples.

EXAMPLE 1

Ethylene and propylene were copolymerized in the presence of a catalyst comprising vanadium oxytrichloride, ethylaluminum sesquichlorid, and BPCC (manufactured by Marine Crott, U.S.A, n-butyl perchlorocrotonate according to a catalog of said company) by a conventional method (e.g., the method described in JP-B-44-9390) to prepare a hexane solution containing an ethylene-propylene copolymer.

This uniform hexane solution (containing about 8 wt % of the copolymer) of the ethylene-propylene copolymer (ethylene content: 73 wt %) contained 47 ppm of $V_2O_5$, 560 ppm of $Al_2O_3$, 700 ppm of Cl, and about 110 ppm of BPCC, calculated as the copolymer.

To 1000 ml of the hexane solution of the copolymer was added 500 ml of an aqueous sodium hydroxide solution having a pH of 13. The mixture was mixed with stirring at 60° C. under atmospheric pressure in a mixer (10000 rpm) for 5 minutes. After the mixture was left to stand for about 10 minutes to separate an aqueous phase, the pH of the aqueous phase was measured and found to be 12.6. A 50 ml portion was sampled from the separated oily phase and poured into 50 ml of methanol with stirring to remove the copolymer. The amount of BPCC remained in the thus obtained hexanemethanol mixed solution was quantitatively determined by mean of gas chromatography (measuring conditions being described below). To the remainder of the oily phase was added 500 ml of pure water. The mixture was mixed with stirring in a mixer (10000 rpm) for 5 minutes and then left to stand to separate the oily phase. Hexane was distilled off from the oily phase by heating to isolate the copolymer. The content of ashes in the copolymer was determined by means of X-ray fluorometry. The coloration of the copolymer was visually evaluated. An odor based on the halogenated ester compound, etc. was not detected at all. The results are shown in Table 1.

Gas chromatoqraphic measurement conditions

Type of device: Hitachi Gas Chromatograph 663-50.
Column: 3 mm diameter×3 m SE-30.
Detection: FID 200° C.
Temperature rise condition: 100° C. constant (10 min)→elevated at a heating rate of 20° C./min (for 5 min) to 200° C.→200° C. constant (15 min)
Retention time: BPCC: 24.5 minutes; Ethyl dichlorophenylacetate: 22 minutes; Methyl trichloroacetate: 7.7 minutes.

EXAMPLES 2 TO 5 AND COMPARATIVE EXAMPLES 1 AND 2

The procedures of Example 1 were repeated except that the type of the halogenated ester compound and the pH of the aqueous alkaline solution for use in the mixing and stirring treatment were changed. The results are shown in Table 1.

EXAMPLE 6

An aqueous alkaline solution (NaOH content: 1.25 mol/l, pH: at least 14) formed by dissolving 5 g of sodium hydroxide in 100 ml of water was added to 1000 ml of the hexane solution of the copolymer prepared in Example 1. The mixture was mixed with stirring at 60° C. under atmospheric pressure in mixer (10000 rpm) for 5 minutes.

Subsequently 500 ml of pure water was added thereto, and the mixture was mixed with stirring in a mixer (10000 rpm) for an additional 5 minutes. After the mixture was left to stand for about 10 minutes to separate an aqueous phase, the pH of the aqueous phase was measured and found to be 13.6. The amount of BPCC remained in the oily phase was quantitatively determined in the same manner as in Example 1. To the separated oily phase was added 500 ml of neutral pure water, and the mixture was mixed with stirring in a mixer (10000 rpm) for 5 minutes to carry out washing. Hexane was distilled off by heating, and the content of ashes was determined -by means of X-ray fluorometry. The coloration of the copolymer was visually evaluated. The results are shown in Table 2.

EXAMPLES 7 AND 8 AND COMPARATIVE EXAMPLE 3

The procedures of Example 6 were repeated except that the pH of the aqueous alkaline solution was changed. The results are shown in Table 2.

TABLE 1

|  | Example | | | | | Comp. Ex. | |
|---|---|---|---|---|---|---|---|
|  | 1 | 2 | 3 | 4 | 5 | 1 | 2 |
| Aqueous alkaline solution | | | | | | | |
| Alkaline compound | NaOH | NaOH | NaOH | NaOH | NaOH | NaOH | omitted |
| Concentration (mol/l) | 0.1 | 0.03 | 0.01 | 0.03 | 0.03 | $3 \times 10^{-4}$ | 0 |
| pH | 12.6 | 11.9 | 10.6 | 11.8 | 12.0 | 10.5 | 6.7 |
| Amount of aqueous alkaline solution (ml) | 500 | 500 | 500 | 500 | 500 | 500 | 500 |
| pH of aqeous phase after separation of oily phase and aqueous phase (pH) | 12.6 | 11.9 | 10.6 | 11.8 | 12.0 | 9.0 | 4.5 |
| Halogenated ester compound (1) | BPCC | BPCC | BPCC | DCPAE | TCAM | DCPAE | BPCC |
| Residual amount of halogenated ester (in hexane) ppm (2) | none | none | none | none | none | 8 | 11 |
| Evaluation of copolymer after purifying | | | | | | | |
| $V_2O_5$ (ppm) | <1 | 2 | 2 | <1 | 3 | 5 | 15 |
| $Al_2O_3$ (ppm) | 6 | 8 | 14 | 6 | 10 | 35 | 70 |
| Cl (ppm) | 18 | 21 | 15 | 24 | 15 | 35 | 45 |
| Color | white | white | white | white | white | pale yellow | pale yellow |
| Odor | odorless | odorless | odorless | odorless | odorless | ester odor | slightly ester odor |

(1) BPCC: n-butyl perchlorocrotonate
DCPAE: ethyl dichlorophenylacetate
TCAM: methyl trichloroacetate
(2) None: The peaks of the halogenated ester and the decomposition product therof were not detected.

TABLE 2

|  | Example 6 | Example 7 | Example 8 | Comp. Ex. 3 |
| --- | --- | --- | --- | --- |
| Aqueous alkaline solution |  |  |  |  |
| Alkaline compound | NaOH | NaOH | NaOH | NaOH |
| Concentration (mol/l) | 1.25 | 0.08 | 0.05 | 0 |
| pH | >14 | 12.9 | 12.7 | 7.0 |
| Amount of aqueous alkaline solution (ml) | 100 | 100 | 100 | 100 |
| Amount of water additionally added (ml) | 500 | 500 | 500 | 500 |
| pH of aqueous phase after separation of oily phase and aqueous phase (pH) | 13.6 | 11.4 | 10.5 | 4.3 |
| Halogenated ester compound (1) | BPCC | BPCC | BPCC | BPCC |
| Residual amount of halogenated ester (in hexane) ppm (2) | none | none | none | 10 |
| Evaluation of copolymer after purifying |  |  |  |  |
| $V_2O_5$ (ppm) | <1 | <1 | <1 | 13 |
| $Al_2O_3$ (ppm) | 4 | 8 | 6 | 65 |
| Cl (ppm) | 3 | 5 | 4 | 48 |
| Color | white | white | white | pale yellow |
| Odor | odorless | odorless | odorless | slightly ester odor |

(1) and (2) being the same as in Table 1.

The second invention is illustrated by means of the following examples and comparative examples.

EXAMPLE 9

To 2000 ml of the hexane solution of the copolymer prepared in Example 1 wa added an aqueous alkaline solution (NaOH content: 1.25 mol/l, pH: at least 14) formed by dissolving 10 g of sodium hydroxide in 200 ml of pure water (saturated with air and having air dissolved therein under atmospheric pressure; iron content: 0.1 ppm or less). The mixture was mixed with stirring in a nitrogen atmosphere at 60° C. under a pressure of 0 kg/cm$^2$G in a mixer (12000 rpm) for 5 minutes. After stirring, 500 ml of pure water (saturated with air and having air dissolved therein under atmospheric pressure) was further added, and the mixture was mixed with stirring in a mixer (12000 rpm) for an additional 5 minutes. After the mixture was left to stand for about 10 minutes to separate an aqueous phase, the pH of the aqueous phase was measured and found to be 13.4. To the separated oily phase was added 500 ml of neutral pure water and the mixture was mixed with stirring in a mixer (12000 rpm) for 5 minutes to carry out washing. Hexane was distilled off from the oily phase by heating to isolate the copolymer. The content of ashes in the copolymer was determined by means of X-ray fluorometry. The coloration of the copolymer was visually evaluated. The results are shown in Table 3.

EXAMPLES 10 AND 11

The procedures of Example 9 were essentially repeated except that the concentration of the aqueous alkaline solution and the amount thereof to be added were changed. The results together with conditions are shown in Table 3.

COMPARATIVE EXAMPLE 4

The procedures of Example 9 were essentially repeated except that the aqueous alkaline solution was omitted. The results are shown in Table 3.

EXAMPLE 12

Into a 50 liter-volume polymerizer were continuously introduced 913 g/hr of ethylene, 1630 g/hr of propylene, 4.08 l/hr of hexane, 0.32 mmol/hr of vanadium oxytrichloride, 6.8 mmol/hr of ethylaluminum sesquichloride and 0.28 g/h of BPCC (manufactured by Marine Crott, U.S.A.) as a polymerization activator. While further 7.2 l/hr of hydrogen as a molecular weight modifier was fed, a polymerization reaction was carried out at a temperature of 50° C. under a pressure of 13 kg/cm$^2$G. The reaction mixture in the polymerizer was continuously drawn out so that the amount of the reaction mixture in the polymerizer was controlled to 25 liter. The drawn-out reaction mixture was led to a flash drum where the reaction mixture was flashed at a temperature of 60° C. under a pressure of 0.8 kg/cm$^2$G to thereby remove the monomer gases. In order to keep the temperature of the flashed solution, heated hexane was added. To 11.6 kg/hr (about 18 l/hr) of the thus obtained polymerization mixture was added an aqueous sodium hydroxide solution (concentration: 0.16 mol/l, pH: 13.2) at a rate of 200 ml/hr. The mixture was mixed in a mixer. Subsequently, 5 l/hr of water saturated with air (deaerated pure water was saturated with air at a temperature of 20° C. under a pressure of 1 kg/cm$^2$G, iron content: 0.1 ppm or less) was added to the mixture. The mixture was mixed in a mixer, and an organic phase was separated from an aqueous phase in a stationary separation drum. The organic phase was washed with water to obtain the final organic phase. Hexane was then distilled off from the final organic phase by flash distillation. The residue was dried to obtain an ethylene-propylene copolymer. The contents of Cl, $Al_2O_3$ and $V_2O_5$ in the copolymer were determined by X-ray fluorometry. The coloration of the copolymer was visually evaluated. The results are shown in Table 4.

EXAMPLE 13

The -procedures of Example 9 were essentially repeated except that the polymerization activator was omitted. The results are shown in Table 4.

EXAMPLE 14

The procedures of Example 9 were essentially repeated except that 1-butene as the α-olefin was used in place of propylene that and a deaerated aqueous alkaline solution was used. The results shown in Table 4.

COMPARATIVE EXAMPLES 4 AND 6

The procedures of Example 9 or 10 was essentially repeated except that deaerated pure water containing no air was used in place of air-saturated water used in Example 12 or 13. The results are shown in Table 4.

TABLE 3

|  | Example 9 | Example 10 | Example 11 | Comp. Ex. 4 |
| --- | --- | --- | --- | --- |
| Aqueous alkaline solution(1) |  |  |  |  |
| Alkaline compound | NaOH | NaOH | NaOH | omitted |
| Concentration (mol/l) | 1.25 | 2.50 | 2.50 | 0 |
| pH | >14 | >14 | >14 | 7 |
| Amount of aqueous | 200 | 10 | 2 | 0 |

TABLE 3-continued

|  | Example | | | Comp. Ex. |
| --- | --- | --- | --- | --- |
|  | 9 | 10 | 11 | 4 |
| alkaline solution (ml) | | | | |
| Amount of additionally added pure water[(2)] (ml) | 500 | 500 | 500 | 500 |
| $O_2$ fed/equivalent $O_2$[(3)] | 7 | 5 | 5 | 5 |
| pH of aqueous phase after separation of oily phase and aqueous phase (pH) | 13.4 | 12.4 | 11.4 | 4.0 |
| Evaluation of copolymer after purifying | | | | |
| $V_2O_5$ (ppm) | <1 | <1 | <1 | 15 |
| $Al_2O_3$ (ppm) | 6 | 4 | 25 | 77 |
| Cl (ppm) | 20 | 24 | 28 | 47 |
| Color | white | white | white | pale yellow |

[(1), (2)]Air-saturated water was used.
[(3)]Equivalent $O_2$: Amount of $O_2$ required for oxidizing vanadium to a pentavalent state.
The treatment with the aqueous alkaline solution and the separation of oily phase and aqueous phase were carried out at 60° C. under a pressure of 0 kg/cm²G.

TABLE 4

|  | Example | | | Comp. EX. | |
| --- | --- | --- | --- | --- | --- |
|  | 12 | 13 | 14 | 5 | 6 |
| Amount fed during polymerization | | | | | |
| Solvent (l/Hr) | 4.1 | 7.3 | 4.9 | 3.4 | 5.2 |
| Ethylene (g/Hr) | 910 | 590 | 622 | 660 | 430 |
| α-Olefin[(a)] (g/Hr) | 1630 | 2220 | 545 | 1120 | 1610 |
| Vanadium compound[(b)] (mmol/Hr) | 0.32 | 5.7 | 0.14 | 0.23 | 4.10 |
| Organoaluminum compound[(c)] (mmol/Hr) | 6.8 | 22.2 | 4.0 | 4.8 | 16.1 |
| Polymerization activator[(d)] | 0.28 | omitted | 0.13 | 0.20 | omitted |
| Polymerization temperature (°C.) | 50 | 40 | 60 | 50 | 40 |
| Aqueous alkaline solution[(1)] | | | | | |
| Alkaline compound | NaOH | NaOH | NaOH | NaOH | NaOH |
| Concentration (mol/l) | 0.16 | 0.41 | 0.30 | 0.16 | 0.50 |
| pH | 13.2 | 13.6 | 13.5 | 13.2 | 13.7 |
| Amount of aqueous alkaline solution (l/Hr) | 0.2 | 0.2 | 0.2 | 0.2 | 0.2 |
| Pure water added[(2)] (l/Hr) | 5 | 5 | 5 | 5 | 5 |
| $O_2$ fed/equivalent $O_2$[(3)] | 17 | 2 | 35 | ~0 | ~0 |
| pH of aqueous phase after separation of oily phase and aqueous phase (pH) | 10.4 | 10.4 | 11.0 | 10.6 | 10.8 |
| Evaluation of copolymer after purifying | | | | | |
| $V_2O_5$ (ppm) | <1 | 2 | <1 | 6 | 35 |
| $Al_2O_3$ (ppm) | 9 | 11 | 3 | 22 | 15 |
| Cl (ppm) | 9 | <1 | 3 | 10 | <1 |
| Color | white | white | white | light gray | grayish green |

[(a)]Butene-1 in Example 14 and propylene in other Examples.
[(b)]Vanadium oxytrichloride
[(c)]Ethylaluminum sesquichloride
[(d)]BPCC
[(e)]Air-saturated water was used in Examples 12 and 13. Deaerated water was used in Example 14 and Comparative Example 5 and 6.
[(2)]Air-saturated water was used in Examples 12 to 14. Deaerated water was used in Comparative Examples 5 and 6.
[(3)]Equivalent $O_2$: Amount of $O_2$ required for oxidizing vanadium to a pentavalent state.
The treatment with the aqueous alkaline solution and the separation of the oily phase and the aqueous phase were carried out at 70° C. under a pressure of 3 kg/cm²G.

As described above, the present invention relates to a method for purifying an ethylene-α-olefin copolymer obtained by polymerizing ethylene with an α-olefin having at least 3 carbon atoms, or ethylene with an α-olefin having at least 3 carbon atoms and a nonconjugated diene compound, in a hydrocarbon solvent in the presence of a catalyst comprising a vanadium compound and an organoaluminum compound, or a catalyst comprising a vanadium compound, an organoaluminum compound, and a halogenated ester compound. According to the method of the present invention, the catalytic ingredients, the halogenated ester compound, etc. can be removed to a level which could not be achieved by conventional methods.

While the present invention has been described in detail and with reference to specific embodiments thereof, it is apparent to one skilled in the art that various changes and modifications can be made therein without departing from the spirit and the scope of the present invention.

What is claimed is:

1. A method for purifying an ethylene-α-olefin copolymer obtained by polymerizing ethylene with an α-olefin having at least 3 carbon atoms, or ethylene with an α-olefin having at least 3 carbon atoms and a nonconjugated diene compound, in a hydrocarbon solvent in the presence of a catalyst comprising a vanadium compound, an organoaluminum compound, and a halogenated ester compound, said method including a step of mixing and stirring a polymerization reaction mixture obtained by the polymerization reaction in an aqueous alkaline solution in such an amount as to give an aqueous phase having a pH of not lower than 10.0 after mixing and stirring.

2. A method as in claim 1, wherein said step comprises the following first and second stages:
a first stage wherein the mixing and stirring of the polymerization reaction mixture obtained by the polymerization reaction is carried out in an aqueous solution containing an alkaline compound in such an amount that an aqueous phase separated in the subsequent second stage has a pH of not lower than 10.0; and
a second stage wherein the mixture obtained in the first stage is separated into an aqueous phase and an organic phase, and the organic phase is washed with neutral water.

3. A method as in claim 1, wherein said step comprises the following first, second, and third stages:
a first stage wherein the mixing and stirring of the polymerization reaction mixture obtained by the polymerization reaction is carried out in an aqueous solution containing an alkaline compound in such an amount that an aqueous phase formed in the subsequent second stage has a pH of not lower than 10.0;
a second stage wherein 1/5 to 10 parts by volume of neutral water is mixed with one part by volume of the mixture obtained in the first stage; and
a third stage wherein the mixture obtained in the second stage is separated into an aqueous phase and an organic phase, and the organic phase is washed with neutral water.

4. A method as in claim 1, wherein said vanadium compound is a compound selected from $VCl_3$, $VCl_4$, $VOCl_3$, and $VO(OR)_{3-m}Cl_m$, wherein R is a straight or branched alkyl group, a cycloalkyl group, or an aryl group, each having 1 to 10 carbon atoms; and $3 \geq m \geq 0$.

5. A method as in claim 1, wherein said organoaluminum compound is a compound selected from $AlR'_nCl_{3-n}$ and $AlR'_n(OR')_3$, wherein R' is a straight chain or branched alkyl group having 1 to 8 carbon atoms; and $3 \geq n \geq 0$.

6. A method as in claim 1, wherein said halogenated ester compound is a compound represented by the following formula:

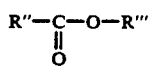

wherein R" represents an organic group having 1 to 20 carbon atoms, which is partially or wholly substituted by a halogen atom; and R'" represents a hydrocarbon group having 1 to 20 carbon atoms.

7. A method for purifying an ethylene-α-olefin copolymer obtained by polymerizing ethylene with an olefin having at least 3 carbon atoms, or ethylene with an α-olefin having at least 3 carbon atoms and a nonconjugated diene compound, in a hydrocarbon solvent in the presence of a catalyst comprising a vanadium compound and an organoaluminum compound, said method including a step of an oxidation treatment of the polymerization reaction mixture obtained by the polymerization reaction in an aqueous alkaline solution in such an amount that an aqueous phase obtained after the oxidation treatment has a pH of not lower than 10.0.

8. A method as in claim 7, wherein said step comprises the following first and second stages:
   a first stage wherein the oxidation treatment of the polymerization reaction mixture obtained by the polymerization reaction is carried out in an aqueous solution containing an oxidizing agent in at least a stoichiometric amount required for oxidizing vanadium present in said mixture to a pentavalent state and an alkaline compound in such an amount that an aqueous phase separated in the subsequent second stage has a pH of not lower than 10.0; and
   a second stage wherein the mixture obtained in the first stage is separated into an aqueous phase and an organic phase, and the organic phase is washed with neutral water.

9. A method as in claim 7, wherein said step comprises the following first, second, and third stages:
   a first stage wherein the oxidation treatment of the polymerization reaction mixture obtained by the polymerization reaction is carried out in an aqueous solution containing an alkaline compound in such an amount that an aqueous phase formed in the subsequent second stage has a pH of not lower than 10.0;
   a second stage wherein 1/5 to 10 parts by volume of water containing an oxidizing agent in at least a stoichiometric amount required for oxidizing vanadium present in said mixture to a pentavalent state is added to one part by volume of water obtained in the first stage; and
   a third stage wherein the mixture obtained in the second stage is separated into an aqueous phase and an organic phase, and the organic phase is washed with neutral water.

10. A method as in claim 7, wherein said oxidizing agent is oxygen.

11. A method as in claim 7, wherein said vanadium compound is a compound selected from $VCl_3$, $VCl_4$, $VOCl_3$, and $VO(OR)_{3-m}Cl_m$, wherein R is a straight or branched alkyl group, a cycloalkyl group, or an aryl group, each having 1 to 10 carbon atoms; and $3 \geq m \geq 0$.

12. A method as in claim 7, wherein said organoaluminum compound is a compound selected from $AlR'_nCl_{3-n}$ and $AlR'_n(OR')_3$, wherein R' is a straight chain or branched alkyl group having 1 to 8 carbon atoms; and $3 \geq n \geq 0$.

13. A method as in claim 7, wherein said catalyst is a catalyst comprising a vanadium compound, an organoaluminum compound, and a halogenated ester compound.

14. A method as in claim 13, wherein said halogenated-ester compound is a compound represented by the following formula:

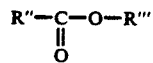

wherein R" represents an organic group having 1 to 20 carbon atoms, which is partially or wholly substituted by a halogen atom; and R'" represents a hydrocarbon group having 1 to 20 carbon atoms.

* * * * *